US012803898B2

(12) United States Patent
Zhang et al.

(10) Patent No.: US 12,803,898 B2
(45) Date of Patent: Nov. 17, 2026

(54) METHOD FOR ADVERTISING A FORWARDING TABLE INDEX, NODE, AND STORAGE MEDIUM

(71) Applicant: ZTE CORPORATION, Shenzhen (CN)

(72) Inventors: Zheng Zhang, Shenzhen (CN); Benchong Xu, Shenzhen (CN); Yuehua Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 19/122,198

(22) PCT Filed: May 12, 2023

(86) PCT No.: PCT/CN2023/093772
§ 371 (c)(1),
(2) Date: Apr. 17, 2025

(87) PCT Pub. No.: WO2024/082617
PCT Pub. Date: Apr. 25, 2024

(65) Prior Publication Data

US 2026/0149655 A1 May 28, 2026

(30) Foreign Application Priority Data

Oct. 17, 2022 (CN) ......................... 202211267967.7

(51) Int. Cl.
*H04L 45/16* (2022.01)
*H04L 45/745* (2022.01)
*H04L 47/33* (2022.01)

(52) U.S. Cl.
CPC ............ *H04L 45/16* (2013.01); *H04L 45/745* (2013.01); *H04L 47/33* (2013.01)

(58) Field of Classification Search
CPC ........ H04L 45/16; H04L 45/745; H04L 47/33
See application file for complete search history.

(56) References Cited

U.S. PATENT DOCUMENTS

2018/0287934 A1* 10/2018 Wang ...................... H04L 12/44
2020/0053000 A1* 2/2020 Zhang ..................... H04L 45/50
(Continued)

FOREIGN PATENT DOCUMENTS

CN 108989209 A 12/2018
CN 109246018 A 1/2019
(Continued)

OTHER PUBLICATIONS

International Search Report for International Application No. PCT/CN2023/093772 dated Aug. 1, 2023.
(Continued)

*Primary Examiner* — Jonathan A Bui
(74) *Attorney, Agent, or Firm* — Knobbe, Martens, Olson & Bear, LLP

(57) ABSTRACT

A method for advertising a forwarding table index, a node, and a storage medium are provided. The method for advertising the forwarding table index includes: determining, according to first information, a specified path-based bit indexed explicit replication-traffic engineering (BIER-TE) forwarding table index of a current node, where the first information includes a sub-domain (SD) and a bit string length (BSL); and advertising the BIER-TE forwarding table index of the current node to another node, where the BIER-TE forwarding table index of the current node is encoded in a preset encoding mode.

20 Claims, 3 Drawing Sheets

(56) References Cited

U.S. PATENT DOCUMENTS

| | | | | |
|---|---|---|---|---|
| 2020/0344162 | A1 | 10/2020 | Dutta | |
| 2021/0092046 | A1 | 3/2021 | Xiong et al. | |
| 2023/0269165 | A1* | 8/2023 | Xie | H04L 45/02 370/389 |

FOREIGN PATENT DOCUMENTS

| | | | | | |
|---|---|---|---|---|---|
| CN | 109660460 | A | | 4/2019 | |
| CN | 112187647 | A | | 1/2021 | |
| CN | 112491718 | A | | 3/2021 | |
| CN | 112511319 | A | | 3/2021 | |
| EP | 4027597 | A1 | | 7/2022 | |
| JP | 2018530268 | A | | 10/2018 | |
| JP | 2020109916 | A | | 7/2020 | |
| WO | WO-2017059699 | A1 | * | 4/2017 | H04L 45/302 |
| WO | WO-2017059708 | A1 | * | 4/2017 | H04L 45/54 |
| WO | WO-2017059709 | A1 | * | 4/2017 | H04L 45/16 |
| WO | WO-2019029698 | A1 | * | 2/2019 | H04W 4/08 |
| WO | WO 2019/169268 | A1 | | 9/2019 | |
| WO | WO 2021/063232 | A1 | | 4/2021 | |

OTHER PUBLICATIONS

Ginsberg et al., "Bit Index Explicit Replication (BIER) Support via IS-IS", Internet Engineering Task Force (IETF), RFC 8401, Jun. 2018.

Wijnands et al., "Encapsulation for Bit Index Explicit Replication (BIER) in MPLS and Non-MPLS Networks", Internet Engineering Task Force (IETF), RFC 8296, Jan. 2018.

Chen et al., "OSPF Extensions for BIER-TE", Network Working Group Internet Draft, Jul. 2022.

Eckert et al., "Tree Engineering for Bit Index Explicit Replication (BIER-TE)", Datatracker, RFC 9262, Oct. 2022.

Japanese Office Action for Japanese Patent Application No. 2025-52226, dated Mar. 3, 2026.

Extended European Search Report for European Application No. 23878615.6 dated Sep. 11, 2026.

* cited by examiner

METHOD FOR ADVERTISING A FORWARDING TABLE INDEX, NODE, AND STORAGE MEDIUM

CROSS-REFERENCE TO RELATED APPLICATIONS

This is a national stage application filed under 35 U.S.C. 371 based on International Patent Application No. PCT/CN2023/093772, filed on May 12, 2023, which claims priority to Chinese Patent Application No. 202211267967.7 filed with the China National Intellectual Property Administration (CNIPA) on Oct. 17, 2022, the disclosures of which are incorporated herein by reference in their entireties.

TECHNICAL FIELD

This application relates to the field of communication technology, for example, to a method for advertising a forwarding table index, a node, and a storage medium.

BACKGROUND

Bit indexed explicit replication (BIER) technology is a multicast data forwarding technology that can forward multicast traffic according to the shortest path to the destination node; while specified path-based bit indexed explicit replication-traffic engineering (BIER-TE) technology enables multicast traffic to be transmitted along a predetermined link until the multicast traffic reaches the destination node. Similar to BIER technology, BIER-TE technology can advertise link information through an internal protocol to form a BIER-TE forwarding table for guiding forwarding, and then when multicast traffic encapsulated by BIER-TE is received, traffic forwarding is completed according to the BIER-TE forwarding table. However, the number of messages advertised by advertising the link information varies as the number of interfaces of nodes varies. When the number of nodes included in the network is large or the number of links between nodes is huge, the scale of the advertised messages is large, which greatly increases the complexity of node processing and may even exceed the processing capacity of some nodes, causing problems.

SUMMARY

A method for advertising a forwarding table index is provided according to embodiments of the present application, and the method includes the following.

According to first information, a specified path-based bit indexed explicit replication-traffic engineering (BIER-TE) forwarding table index of a current node is determined, where the first information includes a sub-domain (SD) and a bit string length (BSL); and the BIER-TE forwarding table index of the current node is advertised to another node, where the BIER-TE forwarding table index of the current node is encoded in a preset encoding mode.

A node is provided according to embodiments of the present application, and the node includes a processor. The processor is configured to, when executing a computer program, implement the method for advertising the forwarding table index according to the above embodiments.

A computer-readable storage medium is further provided according to embodiments of the present application, which stores a computer program, and the computer program, when being executed by a processor, implements the method for advertising the forwarding table index according to the above embodiments.

DETAILED DESCRIPTION

The embodiments described here are only intended to explain the present application. The embodiments of the present application are described hereinafter in conjunction with the drawings.

Multicast technology plays an increasingly important role in Internet services, for example, work-related Internet services such as online conferences, entertainment-related Internet services such as live broadcasts of sports events and concerts, education-related Internet services such as online teaching, and medical surgery and consultation, all of which apply multicast technology.

The core idea of BIER technology is to represent each node at the edge of the network with only one bit. Multicast traffic is transmitted in the intermediate network, and a specific BIER header is additionally encapsulated. This message header marks all destination nodes of the multicast traffic in the form of a bit string. The intermediate nodes route according to the bit to ensure that the traffic can be sent to all the destination nodes. This data-plane forwarding technology, without the multicast tree establishment issue, eliminates the delay caused by multicast tree establishment, and the convergence speed in the BIER technology is the same as that in the open shortest path first (OSPF) protocol and in the intermediate system to intermediate system (IS-IS) protocol, which reduces the huge delay compared with the original multicast tree reestablishment.

The core idea of BIER-TE technology is to transfer the meaning of the bit in the bit string in the BIER message header. Each bit is used to represent a link, instead of a destination node. Similarly, when a message enters the BIER network to be forwarded, the processing of the nodes on this message in the BIER-TE technology is also different from that in the traditional BIER method. First, the queried BIER-TE forwarding table is very similar to the BIER forwarding table in form, but the BIER-TE forwarding table is actually a completely independent forwarding table. Each bit in the forwarding table entry of the table identifies a link, not a node. In addition, in forwarding according to the forwarding table entry, the forwarding and corresponding processing are performed only according to the bits of links connected to this node to ensure that the message will not loop back and can reach the destination correctly. In other words, the BIER technology can forward multicast traffic according to the shortest path to the destination node; while the BIER-TE technology enables multicast traffic to be transmitted according to a predetermined link until the multicast traffic reaches the destination node.

Figure 1:
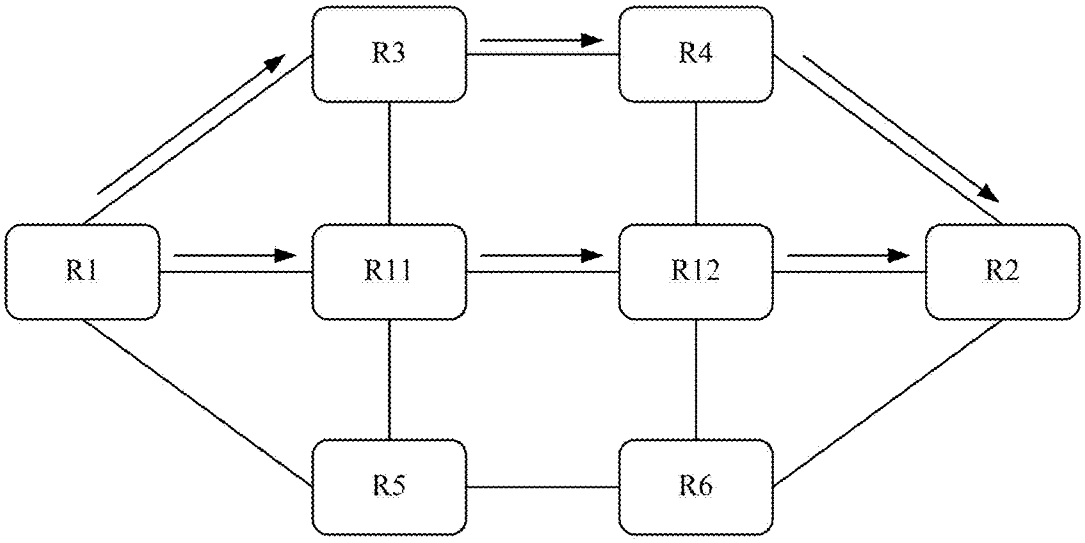
FIG. 1 is a schematic diagram of a network according to an embodiment.

FIG. 1 is a schematic diagram of a network according to an embodiment. As shown in FIG. 1, the network includes nodes R1, R2, R3, R4, R5, R6, R11, and R12. If there is traffic that needs to be sent from R1 to R2 by using the BIER technology for transmission, assuming that the shortest path from R1 to R2 is R1→R11→R12→R2, the traffic may be transmitted along this path. However, assuming that a lot of traffic needs to be transmitted, if all of the traffic follows the shortest path, R11 and R12 may become performance bottlenecks. Therefore, for some traffic, the BIER-TE technology can be used to specify the transmission path for transmission, for example, specifying that the traffic is transmitted through the path of R1→R3→R4→R2, so the path of R11 and R12 can be bypassed. The implementation of the BIER-TE technology is to encapsulate the link from R1 to R3, the link from R3 to R4, and the link from R4 to R2 into the bit string of the BIER-TE message. To achieve the correct encapsulation, parsing and forwarding of the BIER-TE message, each node needs to know the link to which these link information in the bit string points and the corresponding encapsulation method.

The BIER-TE technology is similar to the BIER technology. Link information can be advertised through an internal protocol, such as the OSPF protocol, the IS-IS protocol, the border gateway protocol (BGP), and the babel routing (BABEL) protocol, in the three-layer network to form a BIER-TE forwarding table for guiding forwarding. Then, when multicast traffic encapsulated by BIER-TE is received, traffic forwarding is performed according to the BIER-TE forwarding table.

The way to advertise the link information is generally to advertise the BIER-TE forwarding table identifier (FT-ID) information, used to guide forwarding, along with the link bit position (BP), that is, when a single piece of link information is advertised, the sub-type-length-value (sub-TLV) representing the BIER-TE link BP is advertised. For example, in the IS-IS protocol, a single piece of link information is advertised in the form of neighbor information TLV, and the sub-TLV used to represent the BIER-TE link BP is carried under this TLV. The BIER-TE forwarding table index for guiding forwarding serves as a sub-sub-TLV and is advertised following the sub-TLV of the link BP.

Figure 2:
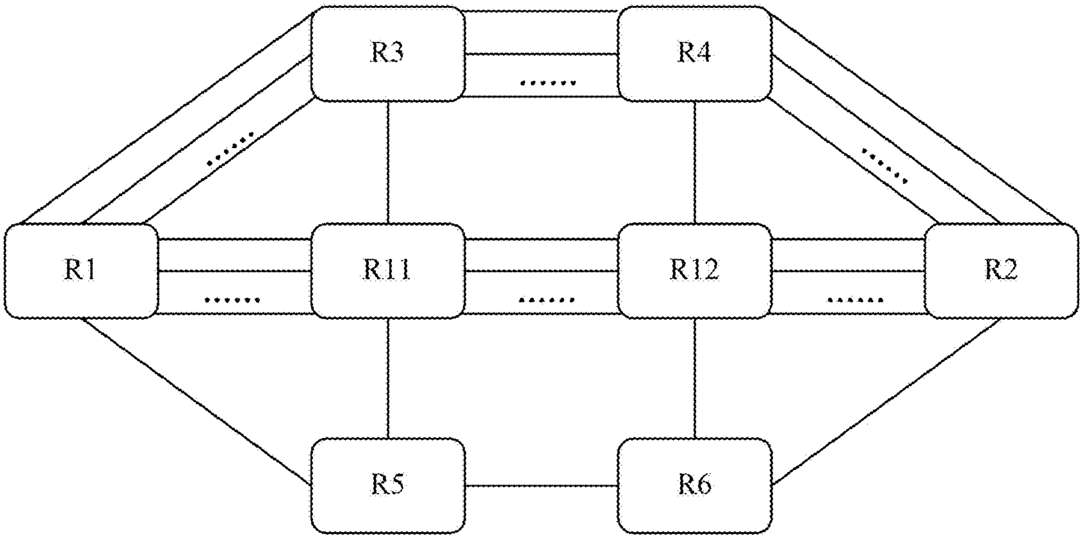
FIG. 2 is a schematic diagram of another network according to an embodiment.

The number of messages advertised in the advertising manner may vary as the number of interfaces of nodes varies. If the network is very simple and there are not many links for each node, this advertising manner may not cause much problem; but in the practical network, the number of links of nodes is often very large. For example, the number of nodes included in the network is large, and the connections between the nodes are complex, so each node has many links; for another example, the number of nodes included in the network may not be large, but the number of links between nodes is huge. FIG. 2 is a schematic diagram of another network according to an embodiment. As shown in FIG. 2, the network includes nodes R1, R2, R3, R4, R5, R6, R11, and R12. Assuming that there are 200 links between R1 and R3, between R3 and R4, between R4 and R2, between R1 and R11, between R11 and R12, between R12 and R2, between R3 and R11, and between R4 and R12 separately, then R1 and R2 each have more than 400 links, and R3, R4, R11, and R12 each have more than 600 links. In the advertising manner, 400 BIER-TE links BPs are advertised by each of R1 and R2, even if one link corresponds to only one forwarding table index, 400 forwarding table indices need to be advertised; and correspondingly, 600 forwarding table indices need to be advertised by each of R3, R4, R11, and R12. However, in practice, one link may correspond to multiple forwarding table indices, and in this case, the number of forwarding table indices to be advertised may continue to rise. For example, if a link corresponds to ten forwarding table indices, the number of forwarding table indices to be advertised may become ten times. Assuming that one forwarding table index occupies 12 bytes, 600 to-be-advertised forwarding table indices occupy 7200 bytes, and 6000 to-be-advertised forwarding table indices occupy 72000 bytes. A single node can support up to 60,000 links, and the occupancy is even greater, reaching 720,000 bytes. Even if there are multiple identical index values, the advertisement must be performed in this manner. In this case, the scale of the messages advertised is very large, which greatly increases the complexity of node processing, and may even exceed the processing capacity of some nodes, causing problems.

The method for advertising a forwarding table index provided in this application can be applied to various communication systems based on the BIER-TE technology. In an embodiment of the present application, a method for advertising a forwarding table index, a node and a storage medium are provided to reduce the scale of the messages sent, simplify the complexity of node processing, and reduce the complexity of network deployment.

Hereinafter, the method for advertising a forwarding table index, the node and technical effect thereof are described.

Figure 3:
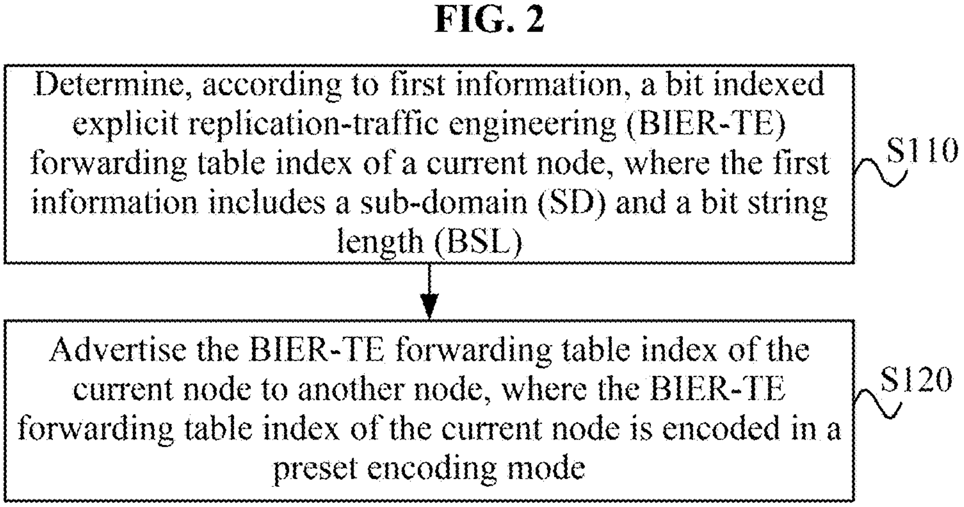
FIG. 3 is a schematic flowchart of a method for advertising a forwarding table index according to an embodiment.

FIG. 3 is a schematic flowchart of a method for advertising a forwarding table index according to an embodiment. As shown in FIG. 3, the method according to this embodiment is applicable to a node, and the method includes S110 and S120 as follows.

In S110, a BIER-TE forwarding table index of a current node is determined according to first information, and the first information includes a sub-domain (SD) and a bit string length (BSL).

In an embodiment, the first information further includes a set-identifier (SI).

In S120, the BIER-TE forwarding table index of the current node is advertised to another node, and the BIER-TE forwarding table index of the current node is encoded in a preset encoding mode.

In an embodiment, the BIER-TE forwarding table index is of at least one of a multi-protocol label switching (MPLS) type and a non-multi-protocol label switching (non-MPLS) type.

In an embodiment, the preset encoding mode may be a prefix reachability encoding mode or a non-prefix reachability encoding mode. When the preset encoding mode is the prefix reachability encoding mode, the BIER-TE forwarding table index is a sub-TLV carried in a sub-TLV of bit indexed explicit replication information, that is, the BIER-TE forwarding table index is a sub-sub-TLV of the bit indexed explicit replication information. When the preset encoding mode is the non-prefix reachability encoding mode, the BIER-TE forwarding table index is a sub-TLV carried in a newly added top-level BIER-TE-TLV.

In an embodiment, the protocol used when advertising the BIER-TE forwarding table index of the current node to another node includes one of the following protocols: the IS-IS protocol, the OSPF protocol, the BGP, the BABEL protocol, and the link layer discovery protocol (LLDP).

The OSPF protocol is an interior gateway protocol (IGP) used to make routing decisions within a single autonomous system (AS). The OSPF protocol is an implementation of the link state routing protocol and belongs to the interior gateway protocol (IGP), so the OSPF protocol operates within an autonomous system. The famous Dijkstra algorithm is used to calculate the shortest path tree. The OSPF is a typical link-state routing protocol. In an autonomous system, all OSPF routers maintain the same database describing the AS structure. The database stores the state information of the corresponding links in the routing domain. The OSPF routers calculate their OSPF routing tables just through this database. As a link-state routing protocol, the OSPF transmits link state advertisement (LSA) to all routers in an area. Link is another term for router interface, so the OSPF is also called interface state routing protocol. The OSPF establishes a link state database by advertising the state of network interfaces between routers and generates the shortest path tree. Each OSPF router uses these shortest paths to construct a routing table.

The IS-IS protocol is an interior gateway protocol and one of the interior gateway protocols commonly used by telecom operators. The standard IS-IS protocol is standardized by the International Organization for Standardization/International Electrotechnical Commission (ISO/IEC) 10589:2002. However, the standard IS-IS protocol is designed for connectionless network services (CLNS) and is not directly suitable for Internet protocol (IP) networks. Therefore, the Internet Engineering Task Force has developed an integrated IS-IS protocol that can be applied to IP networks, called Integrated IS-IS, which is specified by Request For Comments (RFC) documents such as RFC 1195. The IS-IS is an interior gateway routing protocol used within an autonomous system. The IS-IS is a link state protocol that is very similar to the OSPF protocol in the transmission control protocol (TCP)/IP network, and in the IS-IS protocol, the shortest path first algorithm is used for routing calculations.

The BGP is a routing protocol between autonomous systems. The network reachability information exchanged by the BGP provides sufficient information to detect routing loops and make routing decisions based on performance priority and policy constraints. The BGP exchanges network reachability information containing all AS paths and executes routing policies according to configuration information. Generally, the BGP works in conjunction with IGP protocols. Although the BGP is generally used between autonomous systems, with the development of the networks, the BGP tends to be only used as the routing protocol in some scenarios.

The BABEL protocol is a routing protocol that supports IP version 6 (IPv6) and IP version 4 (IPv4) and uses a vector distance algorithm. The BABEL protocol is stable and efficient and can be used in wired and wireless networks. Compared with wired network protocols represented by the routing information protocol (RIP), the BABEL protocol no longer uses the number of hops to select the optimal path, but uses the "expected transmission count" (ETC) to calculate the number of hops to reach a node. The ETC not only considers the information about the number of hops to reach a node but also comprehensively considers a series of indicators such as link bandwidth and congestion as the basis for route selection. However, the ETC may change continuously due to changes in the wireless environment and the joining/exit of network nodes, which may cause the routing to be constantly flipped, making it difficult for the network to converge. Therefore, in the BABEL, a history-sensitive mechanism is used to accelerate network convergence, that is, to select a path that has been used from paths having similar ETC values. In the BABEL protocol, after the network converges, no periodic routing updates and advertisements are performed throughout the network, and the update may be passively triggered only when node information and state change.

In an embodiment, if the current node is adjacent to the other node, and the protocol used to advertise the BIER-TE forwarding table index of the current node to the other node is the IS-IS protocol or the OSPF protocol, the flooding function of the IS-IS protocol or the flooding function of the OSPF protocol is suppressed. In this way, the scale of the sent messages can be reduced.

In an embodiment, if the current node is adjacent to the other node, the preset encoding mode is the prefix reachability encoding mode, and the protocol used to advertise the BIER-TE forwarding table index of the current node to the other node is the BGP or the BABEL protocol, only prefix information is advertised through the BGP or the BABEL protocol. In this way, the scale of the sent messages can be reduced.

In an embodiment, if the protocol used to advertise the BIER-TE forwarding table index of the current node to another node is the LLDP, the characteristic of the LLDP of disallowing multi-hop transmission also enables the scale of the sent messages to be reduced.

Figure 4:
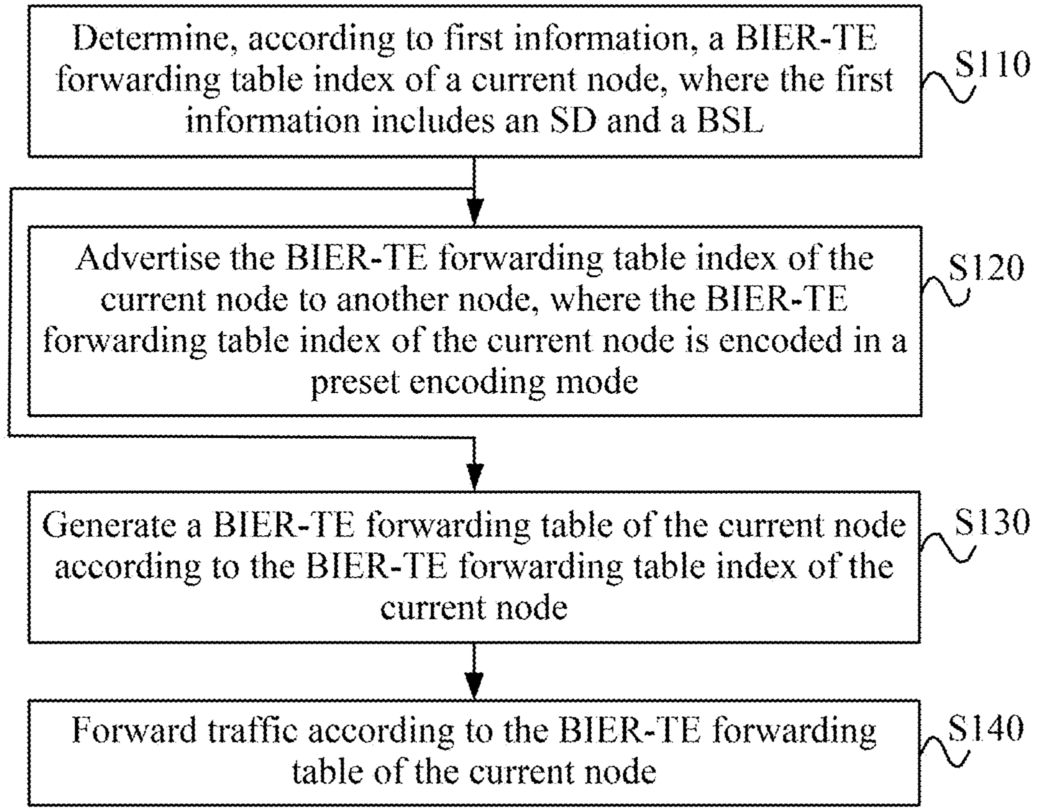
FIG. 4 is a schematic flowchart of another method for advertising a forwarding table index according to an embodiment.

Based on the above embodiment, FIG. 4 is a schematic flowchart of another method for advertising a forwarding table index according to an embodiment. As shown in FIG. 4, after S110 is executed, the method further includes S130 and S140.

In S130, a BIER-TE forwarding table of the current node is generated according to the BIER-TE forwarding table index of the current node.

In an embodiment, in addition to generating its own BIER-TE forwarding table, the current node may further receive a BIER-TE forwarding table index of another node advertised by the other node, and fill the BIER-TE forwarding table index of the other node into the BIER-TE forwarding table of the current node. In this manner, the subsequent smooth forwarding of traffic can be ensured.

In S140, traffic is forwarded according to the BIER-TE forwarding table of the current node.

It can be seen from the description of the above embodiment that S110 and S120 are operations for advertising the BIER-TE forwarding table index of the current node. However, for the current node, after the BIER-TE forwarding table index of the current node is determined, the current node may generate the BIER-TE forwarding table of the current node. That is, there is no execution order relationship between S120 and S130. S140 is the process of forwarding traffic. Generally, to ensure the smooth forwarding of traffic, the network has completed the advertisement of the BIER-TE forwarding table index before the traffic is forwarded. Therefore, S140 is generally required to be executed after S120.

The method of "forwarding the traffic according to the BIER-TE forwarding table of the current node" in S140 may include S1 to S4.

In S1, a first message sent by another node is received and a forwarding table index of the first message is obtained.

In S2, according to the forwarding table index of the first message, a target forwarding table is determined from the BIER-TE forwarding table of the current node, and the target forwarding table corresponds to the forwarding table index of the first message.

In an embodiment, if the BIER-TE forwarding table of the current node does not include the target forwarding table, the first message is discarded. For example, in the above S130, the current node does not receive the BIER-TE forwarding table index of another node advertised by the other node, and the target forwarding table cannot be found in the BIER-TE forwarding table of the current node; in this case, the first message is discarded.

In S3, a next hop node is determined according to the target forwarding table.

In S4, a second message is sent to the next hop node, and the second message includes a BIER-TE forwarding table index of the next hop node.

The first message and the second message may each be understood as traffic that is required to be forwarded.

The method for advertising the forwarding table index according to the present application may not change along with the change in the number of interfaces of nodes, so each forwarding table index only needs to be advertised once (except for update, re-advertising, etc.). Compared with the advertising method in the background technology, when the number of interfaces is large, the method for advertising the forwarding table index according to the present application can reduce the scale of the sent messages, the complexity of node processing, and the complexity of network deployment.

Some exemplary embodiments are listed hereinafter to explain the method for advertising the forwarding table index according to the above embodiments of the present application. The following exemplary embodiments can be implemented alone or in combination.

In a first exemplary embodiment, assuming that R11 in the network shown in FIG. 2 is taken as an example, there are 200 links between R11 and each of R1, R3, and R12, and one link between R11 and R5. BP information of these links is still advertised in the advertising manner in the background technology, but the forwarding table index is no longer advertised following the link BP.

Assuming that the links of R11 belong to SD1 to SD10, a total of ten subdomains, and only one BSL (such as 256) is supported, then R11 may be allocated with the forwarding table index Index-x of the MPLS type according to SD1 and the BSL of 256; allocated with the forwarding table index Index-y of the non-MPLS type according to SD2 and the BSL of 256; allocated with the forwarding table index Index-z of the MPLS type according to SD3 and the BSL of 256, and so on. R11 may be allocated with ten BIER-TE forwarding table indices according to the ten subdomains and the BSL of 256. In an embodiment, according to the same SD and BSL (such as SD1 and the BSL of 256), R11 may be allocated with two BIER-TE forwarding table indices of the MPLS type and the non-MPLS type respectively.

Figure 5:
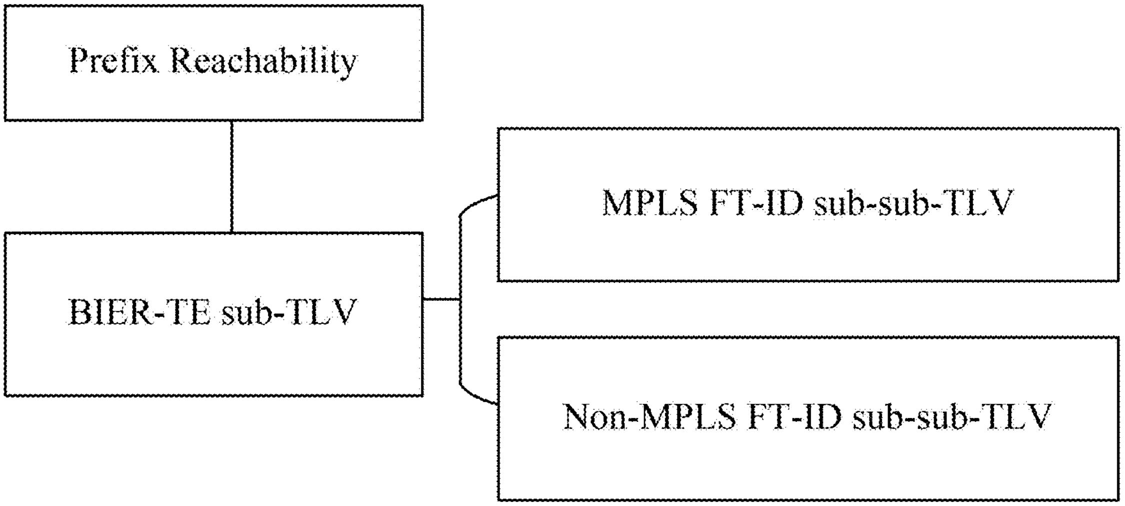
FIG. 5 is a schematic diagram showing the coding of a BIER-TE forwarding table index according to an embodiment.
Figure 6:
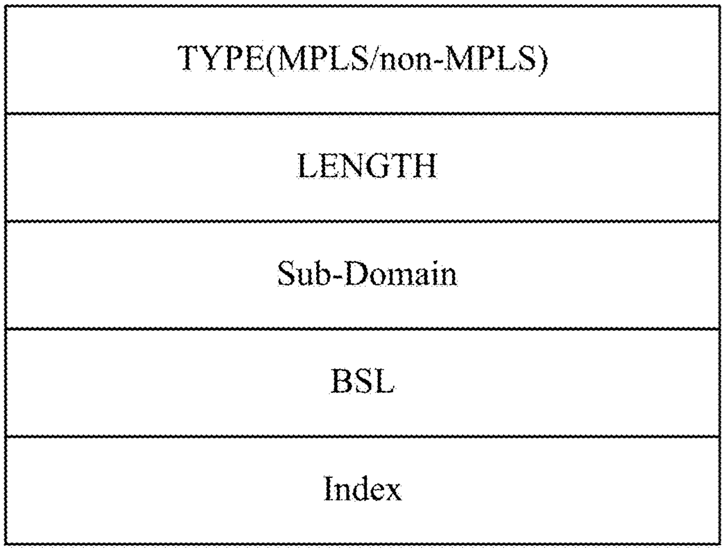
FIG. 6 is a structural diagram of a BIER-TE forwarding table index according to an embodiment.

Assuming that R11 carries prefix reachability advertisement of the node when performing the advertisement through the IS-IS protocol, a prefix may be specified by configuration. When this prefix is advertised, a BIER-TE sub-TLV is newly added, which contains the BIER-TE forwarding table indices of the MPLS type and the non-MPLS type, as shown in FIG. 5. For the structure of the BIER-TE forwarding table index, reference may be made to FIG. 6, which contains the SD, the BSL, and the forwarding table index Index. When the node is allocated with the BIER-TE forwarding table index according to the SD, BSL, and SI, a structure similar to that shown in FIG. 6 may still be used, and only one SI needs to be added to the structure.

R11 also receives the BIER-TE forwarding table index advertised by another node such as R1, R3, R12, and R5 through the IS-IS protocol. Combined with the link BP advertised by another node, the BIER-TE forwarding tables shown in Table 1 and Table 2 may be generated.

TABLE 1

| FT-ID: x (SD: 1, BSL: 256, Type: MPLS) | | |
|---|---|---|
| Link | Neighbor | FT-ID |
| Link-1 | Neighbor-1 | Index-1 |
| Link-3 | Neighbor-3 | Index-2 |
| . . . | . . . | . . . |
| Link-m | Neighbor-m | Index-m |

The value of the BIER-TE forwarding table index shown in Table 1 is x, which means that the forwarding table allocated to the current node is according to SD1, the BSL of 256, and the MPLS type. In the forwarding table x, for link Link-1, the corresponding neighbor of the current node is Neighbor-1, and this neighbor advertises the value Index-1 of the forwarding table index also of SD1, the BSL of 256, and the MPLS type.

TABLE 2

| FT-ID: y (SD: 2, BSL: 256, Type: Non-MPLS) | | |
|---|---|---|
| Link | Neighbor | FT-ID |
| Link-1 | Neighbor-1 | Index-11 |
| Link-2 | Neighbor-3 | Index-12 |
| . . . | . . . | . . . |
| Link-n | Neighbor-n | Index-n |

The value of the BIER-TE forwarding table index shown in Table 2 is y, which means that the forwarding table allocated to the current node is according to SD2, the BSL of 256, and the non-MPLS type. In the forwarding table y, for link Link-1, the corresponding neighbor of the current node is Neighbor-1, and this neighbor advertises the value Index-11 of the forwarding table index also of SD2, the BSL of 256, and the non-MPLS type.

When R11 receives a BIER-TE message from another node, for example, R11 receives a BIER-TE message from R1, the corresponding forwarding table (i.e., the target forwarding table) is located according to the field of the forwarding table index of the message. Assuming that the forwarding table of SD1, the BSL of 256, and the MPLS type shown in Table 1 is located, R11 forwards the message according to the neighbor (i.e., the next node) found in the target forwarding table. Assuming that the message requires to be sent to Neighbor-1 and Neighbor-3, R11 copies the message into two copies, fills the field of the forwarding table index in each message with the values of the forwarding table indices advertised by Neighbor-1 and Neighbor-3 respectively, and then sends the messages to these two nodes. The processing performed by each node is similar to the process described above, and thus the message is forwarded to the destination.

In an embodiment, in addition to using the IS-IS protocol, other protocols such as the OSPF protocol may also be used for advertising. When the OSPF protocol is used for advertising, advertisement of the BIER-TE sub-TLV may also be added along with the advertisement of OSPFv2 extend prefix TLV of the specified prefix, and the information carried in the BIER-TE sub-TLV is similar to the case of the advertisement using the IS-IS protocol. Assuming that the BGP or the BGP-Link state (LS) protocol is used for advertising, the advertisement may be performed following the prefix specified by the node by creating a new BIER-TE Path Attribute, and the information carried in the advertisement is similar to the case of the advertisement using the IS-IS protocol.

In an embodiment, assuming that the to-be-followed prefix cannot be specified by configuration or other means, advertising may be performed by automatically selecting the maximum value or minimum value in the advertised prefixes.

In a second exemplary embodiment, assuming that the nodes in the network do not use the prefix for advertising, for example, in the IS-IS protocol, the three-layer prefix may not be configured, and the method of performing the advertisement following the prefix in the first exemplary embodiment cannot be adopted. In this case, the advertisement may be performed by newly adding a top-level BIER-TE TLV, and the BIER-TE forwarding table indices of the MPLS type and the non-MPLS type included in this TLV are similar to the definitions in the first exemplary embodiment.

Assuming that the nodes in the network use the LLDP for advertising, a similar method may also be adopted to directly add a BIER-TE TLV and carry the BIER-TE forwarding table indices of the MPLS type and/or non-MPLS type for advertising.

This method may also be used to advertise the BIER-TE forwarding table index of the current node, as well as receive the BIER-TE forwarding table index of another node advertised by another node, thereby achieving the correct organization of the BIER-TE forwarding table, thus achieving the correct processing and forwarding of the BIER-TE messages.

In the above first exemplary embodiment, the nodes in the network send the link information to the entire network by default so that the link information of all nodes in the network, including the forwarding table index information, will be learned by the entire network. For example, R1 may receive the advertisement from R3, R5, and R11, as well as R2, R4, R6, and R12. This advertising method is more useful when only one node in the network reports this information to the controller through the BGP-LS protocol.

In the third exemplary embodiment, still taking the network shown in FIG. 2 as an example, assuming that it is not required to advertise the controller of BIER-TE related information, including the forwarding table index, by the BGP-LS technology through one node in the network, then the BIER-TE link BP and the BIER-TE forwarding table index are only required to be advertised between adjacent nodes. For example, after the link information (including the forwarding table index) of R11 is advertised to nodes R1, R3, R5, and R12, nodes R3, R5, and R12 are not required to advertise the information of R11 to the nodes such as R2, R4, and R6.

To achieve the above function, if the current node is adjacent to another node, and advertising the BIER-TE forwarding table index of the current node to the other node is performed through the IS-IS protocol or the OSPF protocol, the flooding function of the IS-IS protocol or the flooding function of the OSPF protocol is suppressed. In this way, information flooded to non-adjacent nodes can be avoided, and the scale of the sent messages can be reduced. If the current node is adjacent to the other node, the preset encoding mode is the prefix reachability encoding mode, and advertising the BIER-TE forwarding table index of the current node to the other node is performed through the BGP or the BABEL protocol, only the prefix information is advertised through the BGP or the BABEL protocol. In this way, there is no need to advertise the BIER-TE forwarding table index carried through the BGP or the BABEL protocol, which can reduce the scale of the sent messages. If advertising the BIER-TE forwarding table index of the current node to the other node is performed through the LLDP, the characteristic of the LLDP of disallowing multi-hop transmission also enables the scale of the sent messages to be reduced.

Figure 7:
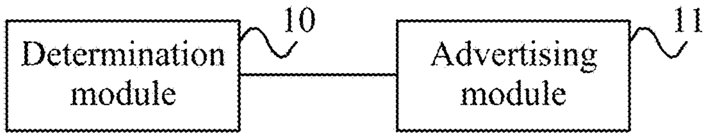
FIG. 7 illustrates a device for advertising a forwarding table index according to an embodiment.

FIG. 7 shows a device for advertising a forwarding table index according to an embodiment, which may be configured in a node. As shown in FIG. 7, the device includes a determination module 10 and an advertising module 11.

The determination module 10 is configured to determine a specified path-based bit indexed explicit replication-traffic engineering (BIER-TE) forwarding table index of a current node according to first information. The first information includes an SD and a BSL. The advertising module 11 is configured to advertise the BIER-TE forwarding table index of the current node to another node. The BIER-TE forwarding table index of the current node is encoded in a preset encoding mode.

The device for advertising the forwarding table index according to this embodiment is for implementing the method for advertising the forwarding table index according to the embodiments shown in FIG. 3 and FIG. 4. The implementation principle and technical effect of the device for advertising the forwarding table index according to this embodiment are similar to those achieved through the embodiments described above, which are not repeated here.

In an embodiment, the first information further includes a set identifier (SI).

In an embodiment, the BIER-TE forwarding table index is of at least one of a multi-protocol label switching (MPLS) type and a non-multi-protocol label switching (non-MPLS) type.

In an embodiment, the preset encoding mode is a prefix reachability encoding mode, and the BIER-TE forwarding table index is a sub-TLV carried in a sub-TLV of bit indexed explicit replication information.

In an embodiment, the preset encoding mode is a non-prefix reachability encoding mode, and the BIER-TE forwarding table index is a sub-TLV carried in a newly added top-level BIER-TE-TLV.

In an embodiment, a protocol used to advertise the BIER-TE forwarding table index of the current node to another node includes one of the following protocols: the intermediate system to intermediate system (IS-IS) protocol, the open shortest path first (OSPF) protocol, the border gateway protocol (BGP), the BABEL protocol, and the link layer discovery protocol (LLDP).

Figure 8:
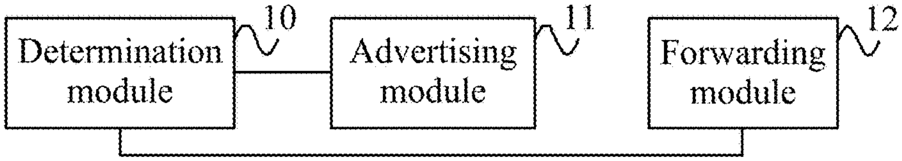
FIG. 8 illustrates another device for advertising a forwarding table index according to an embodiment.

In an embodiment, with reference to FIG. 7 and FIG. 8, another device for advertising a forwarding table index is provided according to an embodiment, the device further includes a forwarding module 12. The determination module 10 is further configured to generate a BIER-TE forwarding table of the current node according to the BIER-TE forwarding table index of the current node. The forwarding module 12 is configured to forward traffic according to the BIER-TE forwarding table of the current node.

In an embodiment, the advertising module 11 is further configured to receive a BIER-TE forwarding table index of another node advertised by another node. The determination module 10 is further configured to fill the BIER-TE forwarding table index of the other node into the BIER-TE forwarding table of the current node.

In an embodiment, the forwarding module 12 is configured to receive a first message sent by another node and obtain a forwarding table index of the first message; determine a target forwarding table from the BIER-TE forwarding table of the current node according to the forwarding table index of the first message, where the target forwarding table corresponds to the forwarding table index of the first message; determine a next hop node according to the target forwarding table; and send a second message to the next hop node, where the second message includes a BIER-TE forwarding table index of the next hop node.

In an embodiment, the forwarding module 12 is further configured to discard the first message in a case where the BIER-TE forwarding table of the current node does not include the target forwarding table.

In an embodiment, in a case where the current node is adjacent to the other node, and advertising the BIER-TE forwarding table index of the current node to the other node is performed by using the IS-IS protocol or the OSPF protocol, a flooding function of the IS-IS protocol or a flooding function of the OSPF protocol is suppressed.

In an embodiment, in a case where the current node is adjacent to the other node, the preset encoding mode is a prefix reachability encoding mode, and advertising the BIER-TE forwarding table index of the current node to the other node is performed by using the BGP or the BABEL protocol, only prefix information is advertised through the BGP or the BABEL protocol.

A node is further provided according to an embodiment of the present application, which includes a processor, and the processor is configured to implement the method according to any embodiment of the present application when executing a computer program. Exemplarily, a schematic structural diagram of a node as a base station is provided in the following embodiment.

Figure 9:
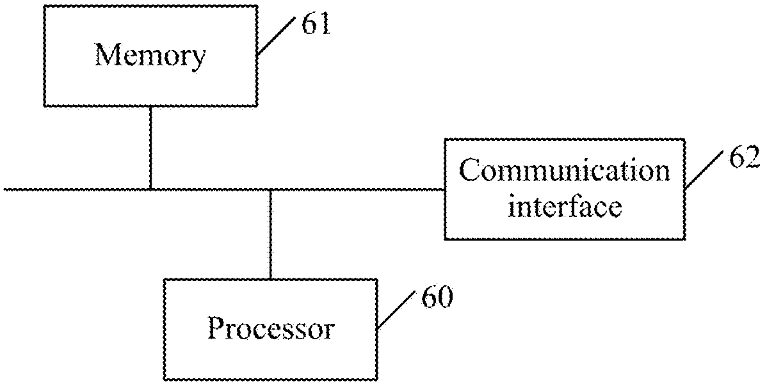
FIG. 9 is a schematic structural diagram of a base station according to an embodiment.

FIG. 9 is a schematic structural diagram of a base station according to an embodiment. As shown in FIG. 9, the base station includes a processor 60, a memory 61 and a communication interface 62. One or more processors 60 may be provided in the base station, and in FIG. 9, one processor 60 is taken as an example. The processor 60, the memory 61 and the communication interface 62 in the base station may be connected by a bus or other means, and in FIG. 9, the connection by bus is taken as an example. The bus represents one or more of several types of bus structures, including a memory bus or a memory controller, a peripheral bus, a graphics acceleration port, a processor or a local bus using any bus structure in a variety of bus structures.

The memory 61, as a computer-readable storage medium, may be configured to store software programs, computer executable programs and modules, such as program instructions/modules corresponding to the method in the embodiment of the present application. The processor 60 executes data processing and at least one functional application of the base station by running the software programs, instructions and modules stored in the memory 61, that is, implementing the above method.

The memory 61 may include a program storage area and a data storage area, the program storage area may store an operating system and at least one application program required by functions, the data storage area may store data created according to the use of the terminal, etc. In addition, the memory 61 may include a high-speed random access memory, and may further include a non-volatile memory, such as at least one magnetic disk storage apparatus, a flash memory device, or other non-volatile solid-state storage apparatus. In some examples, the memory 61 may include memories remotely provided relative to the processor(s) 60, and these remote memories may be connected to the base station through a network. Examples of the aforementioned network include, but are not limited to, the Internet, an intranet, a network, a mobile communication network, or any combination thereof.

The communication interface 62 may be configured to receive and send data.

A computer-readable storage medium is further provided according to an embodiment of the present application, on which a computer program is stored, and the computer program, when being executed by the processor, implements the method provided in any embodiment of the present application.

The computer storage medium of the embodiment of the present application may adopt any combination of one or more computer-readable media. The computer-readable medium may be a computer-readable signal medium or a computer-readable storage medium. The computer-readable storage medium may be, but is not limited to, an electronic, magnetic, optical, electromagnetic, infrared or semiconductor system, apparatus or device, or any combination thereof. The computer-readable storage medium includes (a non-exhaustive list), an electrical connection with one or more wires, a portable computer magnetic disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof. In the present application, the computer-readable storage medium may be any tangible medium including or storing a program. The program may be used by or used in conjunction with an instruction execution system, apparatus, or device.

The computer-readable signal medium may include a data signal on a baseband or propagated as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable medium may send, propagate, or transmit a program used by or in conjunction with an instruction execution system, apparatus, or device.

The program codes included on the computer-readable medium may be transmitted via any appropriate medium which includes, but is not limited to, a wire, an optical cable, a radio frequency (RF), or any appropriate combination thereof.

Computer program codes for performing the operations in the present disclosure may be written in one or more programming languages or a combination thereof. The preceding one or more programming languages include, but are not limited to, object-oriented programming languages (such as Java, Smalltalk, C++, Ruby, and Go), and conventional procedural programming languages (such as "C" language or similar programming languages). Program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The person skilled in the art will appreciate that the term user terminal encompasses any suitable type of wireless user equipment, such as a mobile phone, a portable data processing apparatus, a portable web browser, or a vehicle-mounted mobile station.

Generally speaking, the various embodiments of the present application may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present application is not limited thereto.

Embodiments of the present application may be implemented by a data processor of a mobile apparatus executing computer program instructions, for example, the embodiments of the present application may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present application may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A method for advertising a forwarding table index, comprising:
- determining, according to first information, a specified path-based bit indexed explicit replication-traffic engineering (BIER-TE) forwarding table index of a current node, wherein the first information comprises a sub-domain (SD) and a bit string length (BSL); and
- advertising the specified path-based BIER-TE forwarding table index of the current node to another node, wherein the specified path-based BIER-TE forwarding table index of the current node is encoded in a preset encoding mode.

2. The method for advertising the forwarding table index according to claim 1, wherein the first information further comprises a set identifier (SI).

3. The method for advertising the forwarding table index according to claim 1, wherein a type of the specified path-based BIER-TE forwarding table index is at least one of a multi-protocol label switching (MPLS) type or a non-multi-protocol label switching (non-MPLS) type.

4. The method for advertising the forwarding table index according to claim 1, wherein the preset encoding mode is a prefix reachability encoding mode, and the specified path-based BIER-TE forwarding table index is a sub-type-length-value (sub-TLV) carried in a sub-TLV of bit indexed explicit replication information.

5. The method for advertising the forwarding table index according to claim 1, wherein the preset encoding mode is a non-prefix reachability encoding mode, and the specified path-based BIER-TE forwarding table index is a sub-TLV carried in a newly added top-level BIER-TE-type-length-value (BIER-TE-TLV).

6. The method for advertising the forwarding table index according to claim 1, wherein advertising the specified path-based BIER-TE forwarding table index of the current node to the another node uses one of the following protocols: an intermediate system to intermediate system (IS-IS) protocol, an open shortest path first (OSPF) protocol, a border gateway protocol (BGP), a babel routing (BABEL) protocol, and a link layer discovery protocol (LLDP).

7. The method for advertising the forwarding table index according to claim 1, further comprising:
- generating a BIER-TE forwarding table of the current node according to the specified path-based BIER-TE forwarding table index of the current node; and
- forwarding traffic according to the BIER-TE forwarding table of the current node.

8. The method for advertising the forwarding table index according to claim 7, after generating the BIER-TE forwarding table of the current node, further comprising:
- receiving a BIER-TE forwarding table index of the another node advertised by the another node; and
- filling the BIER-TE forwarding table index of the another node into the BIER-TE forwarding table of the current node.

9. The method for advertising the forwarding table index according to claim 7, wherein forwarding the traffic according to the BIER-TE forwarding table of the current node comprises:
- receiving a first message sent by the another node and obtaining a forwarding table index of the first message;
- determining a target forwarding table from the BIER-TE forwarding table of the current node according to the forwarding table index of the first message, wherein the target forwarding table corresponds to the forwarding table index of the first message;
- determining a next hop node according to the target forwarding table; and
- sending a second message to the next hop node, wherein the second message comprises a BIER-TE forwarding table index of the next hop node.

10. The method for advertising the forwarding table index according to claim 9, further comprising:
- in response to the BIER-TE forwarding table of the current node not comprising the target forwarding table, discarding the first message.

11. The method for advertising the forwarding table index according to claim 1, wherein in response to the current node being adjacent to the another node, and in response to a protocol used by advertising the specified path-based BIER-TE forwarding table index of the current node to the another node being an IS-IS protocol or an OSPF protocol, a flooding function of the IS-IS protocol or a flooding function of the OSPF protocol is suppressed.

12. The method for advertising the forwarding table index according to claim 1, wherein in response to the current node being adjacent to the another node and the preset encoding mode being a prefix reachability encoding mode, and in response to a protocol used by advertising the specified path-based BIER-TE forwarding table index of the current node to the another node being a BGP or a BABEL protocol, only prefix information is advertised through the BGP or the BABEL protocol.

13. A node, comprising a processor, wherein the processor is configured to, when executing a computer program, implement the following:

determining, according to first information, a specified path-based bit indexed explicit replication-traffic engineering (BIER-TE) forwarding table index of a current node, wherein the first information comprises a sub-domain (SD) and a bit string length (BSL); and advertising the specified path-based BIER-TE forwarding table index of the current node to another node, wherein the specified path-based BIER-TE forwarding table index of the current node is encoded in a preset encoding mode.

14. A non-transitory computer-readable storage medium storing a computer program, wherein the computer program, when being executed by a processor, implements the following:

determining, according to first information, a specified path-based bit indexed explicit replication-traffic engineering (BIER-TE) forwarding table index of a current node, wherein the first information comprises a sub-domain (SD) and a bit string length (BSL); and advertising the specified path-based BIER-TE forwarding table index of the current node to another node, wherein the specified path-based BIER-TE forwarding table index of the current node is encoded in a preset encoding mode.

15. The node according to claim 13, wherein the first information further comprises a set identifier (SI).

16. The node according to claim 13, wherein a type of the specified path-based BIER-TE forwarding table index is at least one of a multi-protocol label switching (MPLS) type or a non-multi-protocol label switching (non-MPLS) type.

17. The node according to claim 13, wherein the preset encoding mode is a prefix reachability encoding mode, and the specified path-based BIER-TE forwarding table index is a sub-type-length-value (sub-TLV) carried in a sub-TLV of bit indexed explicit replication information.

18. The node according to claim 13, wherein the preset encoding mode is a non-prefix reachability encoding mode, and the specified path-based BIER-TE forwarding table index is a sub-TLV carried in a newly added top-level BIER-TE-type-length-value (BIER-TE-TLV).

19. The node according to claim 13, wherein the processor is configured to advertise the specified path-based BIER-TE forwarding table index of the current node to the another node by using one of the following protocols: an intermediate system to intermediate system (IS-IS) protocol, an open shortest path first (OSPF) protocol, a border gateway protocol (BGP), a babel routing (BABEL) protocol, and a link layer discovery protocol (LLDP).

20. The node according to claim 13, wherein the processor is configured to further perform:

generating a BIER-TE forwarding table of the current node according to the specified path-based BIER-TE forwarding table index of the current node; and forwarding traffic according to the BIER-TE forwarding table of the current node.

* * * * *